US008272065B2

(12) United States Patent
Persson et al.

(10) Patent No.: US 8,272,065 B2
(45) Date of Patent: Sep. 18, 2012

(54) SECURE CLIENT-SIDE AGGREGATION OF WEB APPLICATIONS

(75) Inventors: Jan Patrik Persson, Lund (SE); Björn Johansson, Lund (SE); Song Yuan, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 659 days.

(21) Appl. No.: 12/401,851

(22) Filed: Mar. 11, 2009

(65) Prior Publication Data
US 2010/0235885 A1 Sep. 16, 2010

(51) Int. Cl.
G06F 21/00 (2006.01)
(52) U.S. Cl. ............... 726/27; 726/1; 726/4; 726/29; 715/234
(58) Field of Classification Search .................. None
See application file for complete search history.

(56) References Cited

U.S. PATENT DOCUMENTS

| 2002/0188869 | A1* | 12/2002 | Patrick .............. | 713/201 |
|---|---|---|---|---|
| 2003/0018898 | A1* | 1/2003 | Lection et al. .......... | 713/182 |
| 2008/0295164 | A1 | 11/2008 | Steiner et al. | |
| 2008/0301766 | A1 | 12/2008 | Makino et al. | |
| 2008/0313648 | A1* | 12/2008 | Wang et al. ............ | 719/315 |
| 2009/0328137 | A1* | 12/2009 | Liang et al. ............ | 726/1 |

OTHER PUBLICATIONS

E. Damiani et al. "A Fine-Grained Access Control System for XML Documents," ACM Transactions on Information and System Security, vol. 5, No. 2, May 2002, pp. 169-202.*
N. Kitagawa et al. "A Study on Efficient Access Control for XML Documents," Proceedings of the 21st International Conference on Data Engineering, 2005.*
E. Bertino et al. "Specifying and enforcing access control policies for XML document sources," World Wide Web 3, 2000, pp. 139-151.*
D. Ferraiolo et al. "Role-Based Access Controls," 15th National Computer Security Conference, Oct. 13-16, 1992, pp. 554-563.*
A. Gabillon, "Regulating access to XML documents", IFIP Working Conference on Database and Application Security, 2001, pp. 299-314.*
C. Jackson, et al. "Subspace: Secure Cross-Domain Communication for Web Mashups," WWW 2007, May 8-12, 2007, ACM, 10 pages.*
S. Crites, et al. "OMash: Enabling Secure Web Mashups via Object Abstractions," CCS'08, Oct. 27-31, 2008, ACM, 9 pages.*
P. Austel, et al. "Secure Delegation for Web 2.0 and Mashups," 2008 Workshop on Web 2.0 Security and Privacy, IBM Corporation 2008, 7 pages.*
Damiani, E. et al. "Securing XML Documents." Lecture Notes in Computer Sciences, vol. 1777, Jan. 1, 2000, pp. 121-135.

(Continued)

Primary Examiner — Jung Kim
Assistant Examiner — Robert Leung
(74) Attorney, Agent, or Firm — Coats & Bennett, P.L.L.C.

(57) ABSTRACT

A web browser client includes an aggregated web application runtime environment that controls access by a program fragment of an aggregated web application to a resource therein based upon the originating domain of the program fragment. To do so, the aggregated web application runtime environment appends an access attribute to the Document Object Model (DOM) node associated with the resource. This access attribute is associated with a plurality of access rights definitions where each access rights definition defines a set of access rights to the resource for program fragments originating from a domain with a specific access rights status. Accordingly, the aggregated web application runtime environment sets one or more access rights statuses of the originating domain of the program fragment, and thereafter, grants or denies the program fragment access to the resource based upon one or more sets of access rights defined for that program fragment.

22 Claims, 8 Drawing Sheets

OTHER PUBLICATIONS

Livshits, B. et al. "Using Web Application Construction Frameworks to Protect Against Code Injection Attacks." PLAS07, Jun. 14, 2007, San Diego, CA, US. Available at: http://research.microsoft.com/en-us/um/people/livshits/papers/pdf/plas07.pdf.

Felt, A. et al. "Talking to Strangers without Taking their Candy: Isolating Proxied Content." SocialNets '08, Apr. 1, 2008, Galsgow, Scotland, UK. Available at: http://www.cs.virginia.edu/felt/secure_mashups.pdf.

Yoshihama, S. et al. "Security Model for the Client-Side Web Application Environments." 2007, Internet article available at: http://w2spconf.com/2007/papers/paper-159-z_7167.pdf.

Wang, H. J. et al. "Protection and Communication Abstractions for Web Browsers in MashupOS." SPSO'07, Oct. 14-17, 2007, Stevenson, Washington, US. Available at: http://research.microsoft.com/en-us/um/people/helenw/papers/sosp07mashupos.pdf.

Jim, T. et al. "Defeating Script Injection Attacks with Browser-Enforced Embedded Policies." WWW2007, May 8-12, 2007, Banff, Alberta, Canada. Available at: http://www2007.org/papers/paper595.pdf.

Howell, J. et al. "MashupOS: Operating System Abstractions for Client Mashups." Publication date unknown. Internet article available at: http://research.microsoft.com/en-us/um/people/helenw/papers/mashuposhotos.pdf.

* cited by examiner company.se/index.html

```
L1:    <html>
L2:      <head>
L3:        <title>Google Maps JavaScript API Example</title>
L4:        <script src="http://maps.google.com/lib.js"
    security="google" ></script>
L5:        <script>
L6:          function load() {
L7:            var map = new GMap2(document.getElementById("map"));
L8:            map.setCenter(new GLatLng(37.4419, -122.1419), 13);
L9:          }
L10:       </script>
L11:     </head>
L12:     <body onload="load()">
L13:       <div id="map" security="google"></div>
L14:       <div security="company">
L15:         <span>My number:</span>
L16:         <span id="home" >+4646193000</span>
L17:       </div>
L18:       <p>The sky is blue, the grass is green</p>
L19:     </body>
L20:   </html>
```

*FIG. 3A* company.se/policy

```
P1:    allow untrustedoperator_role default {read}
P2:    allow untrustedoperator_role company { }
P3:    allow untrustedoperator_role google { }
...
P4:    allow trustedoperator_role default {read, write, execute}
P5:    allow trustedoperator_role company {read, write, execute}
P6:    allow trustedoperator_role google {read, execute}
...
P7:    allow specialoperator_role default { }
P8:    allow specialoperator_role company { }
P9:    allow specialoperator_role google {read, write, execute}
```

*FIG. 3B* company.se/roles

```
maps.google.com : untrustedoperator_role , specialoperator_role
company.se : trustedoperator_role
```

*FIG. 3C* company.se/index.html

```
L1:   <html>
L2:     <head>
L3:       <title>Google Maps JavaScript API Example</title>
L4:       <script src="http://maps.google.com/lib.js"
          permission="rwx--x---"></script>
L5:       <script>
L6:         function load() {
L7:           var map = new GMap2(document.getElementById("map"));
L8:           map.setCenter(new GLatLng(37.4419, -122.1419), 13);
L9:         }
L10:      </script>
L11:    </head>
L12:    <body onload="load()">
L13:      <div id="map" owner="maps.google.com"></div>
L14:      <div permission="rwx------">
L15:        <span>My number:</span>
L16:        <span id="home" >+4646193000</span>
L17:      </div>
L18:      <p>The sky is blue, the grass is green</p>
L19:    </body>
L20:  </html>
```

*FIG. 5A* company.se/group

```
maps.google.com : company.se
```

*FIG. 5B* company.se/index.html

```
L1:     <html>
L2:     <head>
L3:     <title>Google Maps JavaScript API Example</title>
L4:     <script src="http://level2api.embrace.ericsson.com/lib.js"
          security="level2api"></script>
L5:     <script src="http://level3api.embrace.ericsson.com/lib.js"
          security="level3api"></script>
L6:     <script src="http://maps.google.com/lib.js"
          security="google"></script>
L7:     <script>
L8:       function load() {
L9:         var map = new GMap2(document.getElementById("map"));
L10:      }
L11:    </script>
L12:    </head>
L13:    <body onload="load()">
L14:      <div id="map" security="google"></div>
L15:      <input type="button" value="Call Google Support"
L16:        onclick="System.VoiceCall.makeVoiceCall('+1 650-253-0000')"/>
L17:    </body>
L18:    </html>
```

FIG. 7A maps.google.com/lib.js

```
function GMap2(div) {
  this.setCenter(new GLatLng(System.GPS.getLatitude(),
    System.GPS.getLongtitude()), 13);
}
```

FIG. 7B embrace.ericsson.com/policy

```
P1:     allow untrustedoperator_role default {read}
P2:     allow untrustedoperator_role level2api { }
P3:     allow untrustedoperator_role level3api { }
P4:     allow untrustedoperator_role google { }
...
P5:     allow trustedoperator_role default {read, write, execute}
P6:     allow trustedoperator_role level2api {read, execute}
P7:     allow trustedoperator_role level3api {read, execute}
P8:     allow trustedoperator_role google {read, execute }
...
P9:     allow specialoperator_role default { }
P10:    allow specialoperator_role level2api {execute}
P11:    allow specialoperator_role level3api { }
P12:    allow specialoperator_role google {read, write, execute}
```

FIG. 7C embrace.ericsson.com/roles

```
maps.google.com : untrustedoperator_role , specialoperator_role
company.se : trustedoperator_role
```

FIG. 7D company.se/index.html

```
L1:    <html>
L2:      <head>
L3:        <title>Google Maps JavaScript API Example</title>
L4:        <script src="http://level2api.embrace.ericsson.com/lib.js"
           permission="rwx--x---"></script>
L5:        <script src="http://level3api.embrace.ericsson.com/lib.js"
           permission="rwx--x---"></script>
L6:        <script src="http://maps.google.com/lib.js"
           permission="rwx--x---"></script>
L7:        <script>
L8:          function load() {
L9:            var map = new GMap2(document.getElementById("map"));
L10:         }
L11:       </script>
L12:     </head>
L13:     <body onload="load()">
L14:       <div id="map" owner="maps.google.com"></div>
L15:       <input type="button" value="Call Google Support"
L16:         onclick="System.VoiceCall.makeVoiceCall('+1 650-253-0000')"/>
L17:     </body>
L18:   </html>
```

*FIG. 8A* maps.google.com/lib.js

```
function GMap2(div) {
  this.setCenter(new GLatLng(System.GPS.getLatitude(),
    System.GPS.getLongtitude()), 13);
  ......
}
```

*FIG. 8B* embrace.ericsson.com/group

```
level2api.embrace.ericsson.com : company.se , maps.google.com
level3api.embrace.ericsson.com : company.se
maps.google.com : company.se
```

*FIG. 8C* understand# SECURE CLIENT-SIDE AGGREGATION OF WEB APPLICATIONS

TECHNICAL FIELD

The present invention generally relates to methods and apparatus for securely aggregating web applications, and particularly relates to controlling requests by a program fragment of an aggregated web application for a resource based on the originating domain of that program fragment.

BACKGROUND

Many web developers, such as those of Google® Maps, are exposing external application programming interfaces (APIs) for their web applications. Other web developers can embed references to these external APIs within the web pages of their own web applications to thereby aggregate the functionality of multiple web applications. By importing this external API into a different web application, the resulting aggregated web application can utilize the resources of the external web application in conjunction with their own resources. A program fragment within a mobile terminal phonebook web application, for example, could invoke the Google® Maps JavaScript constructor to create a map of a contact's address within a certain HyperText Markup Language (HTML) element of the mobile terminal phonebook web application. While this aggregation of web applications creates new functionality not present within either web application individually, it also creates new implications for security and privacy.

More particularly, the new functionality desired in aggregated web applications often requires an external web application to have at least limited access to some of the resources of the aggregated web application's runtime environment (e.g., reading a phonebook contact's address). However, importing the external web application into the aggregated web application makes the external web application execute in the context of the aggregated web application runtime environment and, therefore, actually has full access to all of its resources (e.g., writing over or deleting all of a phonebook contact's information). Thus, if the aggregated web application is to provide new functionality, it must absolutely trust the external web application with such access. Of course, this absolute trust is not always present particularly because aggregated web applications often originate from different web developers and domains. This frequent lack of absolute trust often forces the aggregated web application to sacrifice functionality for security. In other situations, the desire for new functionality forces the aggregated web application to sacrifice security for functionality.

SUMMARY

Methods and apparatus taught herein advantageously permit an aggregated web application to maintain both functionality and security. Instead of allowing all program fragments of the aggregated web application full access to all resources of the aggregated web application, an aggregated web application runtime environment of the instant invention controls access to those resources based on the originating domain of program fragments.

More particularly, the aggregated web application runtime environment appends an access attribute to the Document Object Model (DOM) node associated with a resource. The value of the appended access attribute is either specified explicitly in the web page of the aggregated web application, or alternatively, defaulted to a previously set value by the aggregated web application runtime environment. In either case, this access attribute is in turn associated with a plurality of access rights definitions. Each access rights definition defines a set of access rights (e.g., low level access rights such as read, write, or execute) to the resource for program fragments originating from a domain with a specific access rights status.

An access rights status as used herein denotes any classification of one or more originating domains that is employed to define a set of access rights for program fragments originating from those domains. An example of an access rights status includes, for instance, a role status (e.g., an untrusted domain role status, a trusted domain role status, or a special domain role status). In operation, multiple originating domains may belong to the same classification, and therefore, have the same access rights status. In this case, an access rights status enables the defining of a set of access rights for program fragments originating from different domains without resort to explicit definitions based on each of those domains individually. However, because a single originating domain may have multiple access rights statuses (e.g. both a trusted domain role status and a special domain role status), a program fragment originating from that domain may have multiple sets of access rights defined among multiple access rights definitions. In this case, such a program fragment has a certain access right as long as it is included in any one of the sets of access rights defined by these multiple access rights definitions.

Whether a particular access right is included in a set of access rights defined by an access rights definition may vary based on the security and functionality requirements of the aggregated web application. If an aggregated web application includes a resource that comprises particularly sensitive information or functionality, for example, the set of access rights may be defined explicitly in the web page so that no access rights to that resource are included. If the resource does not comprise such sensitive information or functionality, however, the aggregated web application runtime environment may be configured to include a default set of access rights to that resource (e.g., read only).

With the sets of access rights to the resource defined through the appended access attribute as described above, the aggregated web application runtime environment sets one or more access rights statuses of the originating domain of the program fragment attempting to access the resource. Such setting may also be based upon the issuance of one or more security certificates issued to that originating domain. In either case, the aggregated web application runtime environment grants or denies the program fragment access to the resource based upon one or more sets of access rights defined for that program fragment.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIGS. 3A-3C are example web page and definition files encoded for the aggregated web application runtime environment of the instant invention, structured for mapping to a role based access control file system.

FIGS. 5A-5B are example web page and definition files encoded for the aggregated web application runtime environment of the instant invention, structured for mapping to an access control list based file system.

FIGS. 7A-7D are example web page and definition files encoded for the aggregated web application runtime environment of the instant invention, structured for setting access rights statuses based on the issuance of security certificates and for mapping to a role based access control file system.

FIGS. 8A-8C are example web page and definition files encoded for the aggregated web application runtime environment of the instant invention, structured for setting access rights statuses based on the issuance of security certificates and for mapping to an access control list based file system.

DETAILED DESCRIPTION

Figure 1:
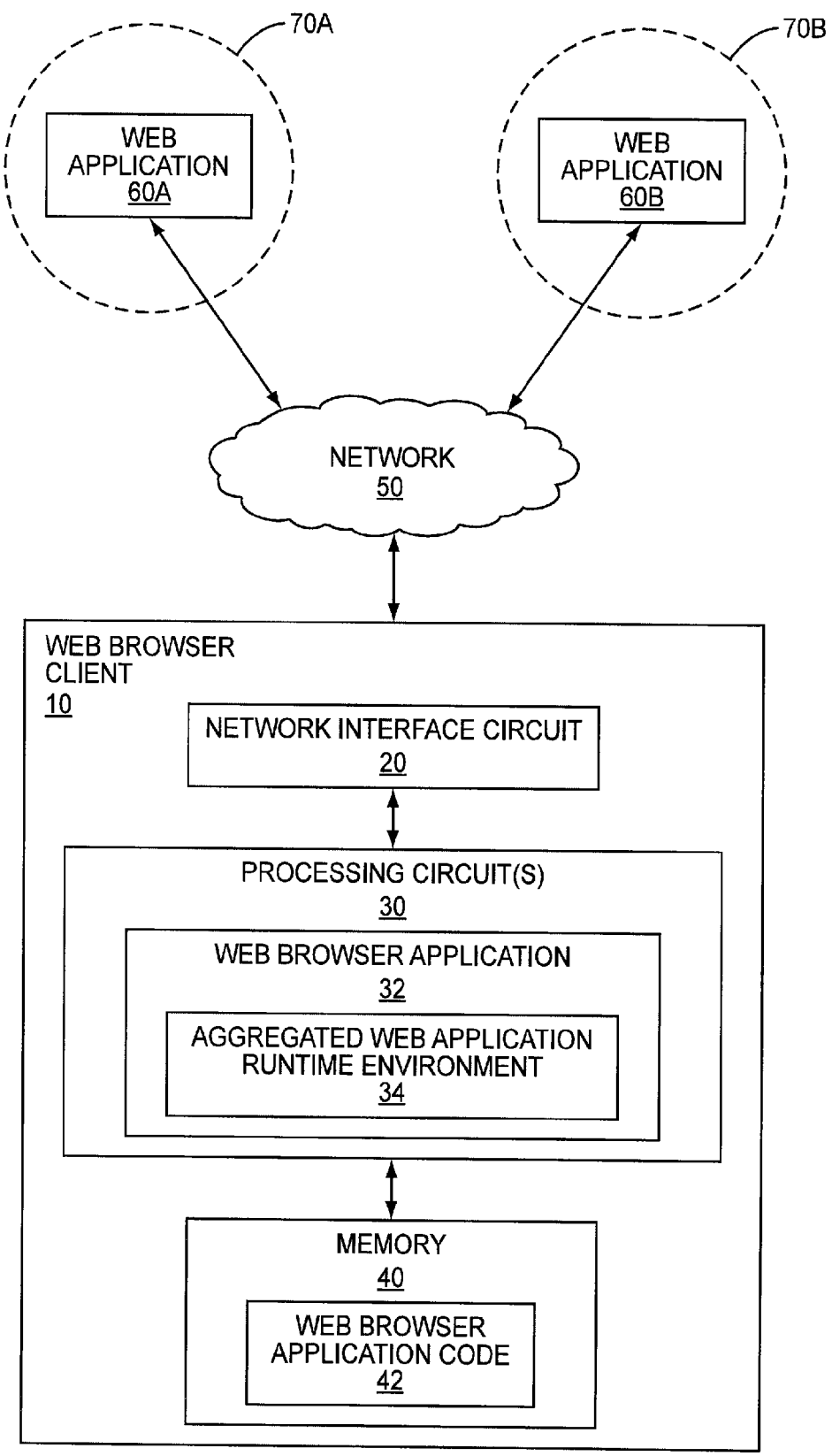
FIG. 1 is a block diagram illustrating one embodiment of a web browser client of the instant invention.

FIG. 1 illustrates an embodiment of a web browser client 10 communicatively coupled via a network 50 to a plurality of web applications 60 from different domains 70. One of these web applications 60A from one domain 70A provides a web page to the web browser client 10. This web page contains client-side script that references an external API of a web application 60B from a different domain 70B. Accordingly, the web browser client 10 is configured to import the external API and execute the web page and external API as the aggregation of web applications 60A and 60B. To ensure both the security and functionality of such an aggregated web application, the web browser client 10 includes a network interface circuit 20, one or more processing circuits 30, and a memory 40.

The network interface circuit 20 communicatively couples the web browser client 10 to the web applications 60. Specifically, the network interface circuit 20 delivers the web page and the external API from web applications 60A and 60B, respectively, to the one or more processing circuits 30.

The one or more processing circuits 30 execute web browser application code 42 contained within the memory 40 to thereby create a web browser application 32 for rendering the aggregated web application. This web browser application 32 includes an aggregated web application runtime environment 34 for supporting the aggregated web application as a client-side web application. Various client-side resources of the aggregated web application, therefore, exist within the aggregated web application runtime environment 34. Such resources include, for example, textual content or variables and functions of client-side script utilized in the web page and external API (e.g., event callback functions). The Document Object Model (DOM) associates these resources with a DOM node within the DOM structure of the web page. Thus, a program fragment of the aggregated web application may access these resources through the DOM structure.

However, instead of permitting any program fragment of the aggregated web application unregulated access to the DOM structure, and thus, the resources of the aggregated web application, the aggregated web application runtime environment 34 controls such access based on the originating domain of that program fragment. That is, the aggregated web application runtime environment 34 recognizes some resources may comprise sensitive information (e.g., phone numbers) or perform restricted functionality (e.g., overwriting data) that should only be retained or executed by program fragments from certain originating domains. A program fragment originating from the Google® Maps domain, for example, should not be able to examine the phone numbers of those contacts whose addresses it depicts on a map. That same program fragment, however, should be given unrestricted access to the HTML elements necessary to provide the desired functionality of mapping those contacts' addresses. The aggregated web application runtime environment 34 permits this secure functionality by controlling access to the resources of an aggregated web application according to the method illustrated in FIG. 2.

Figure 2:
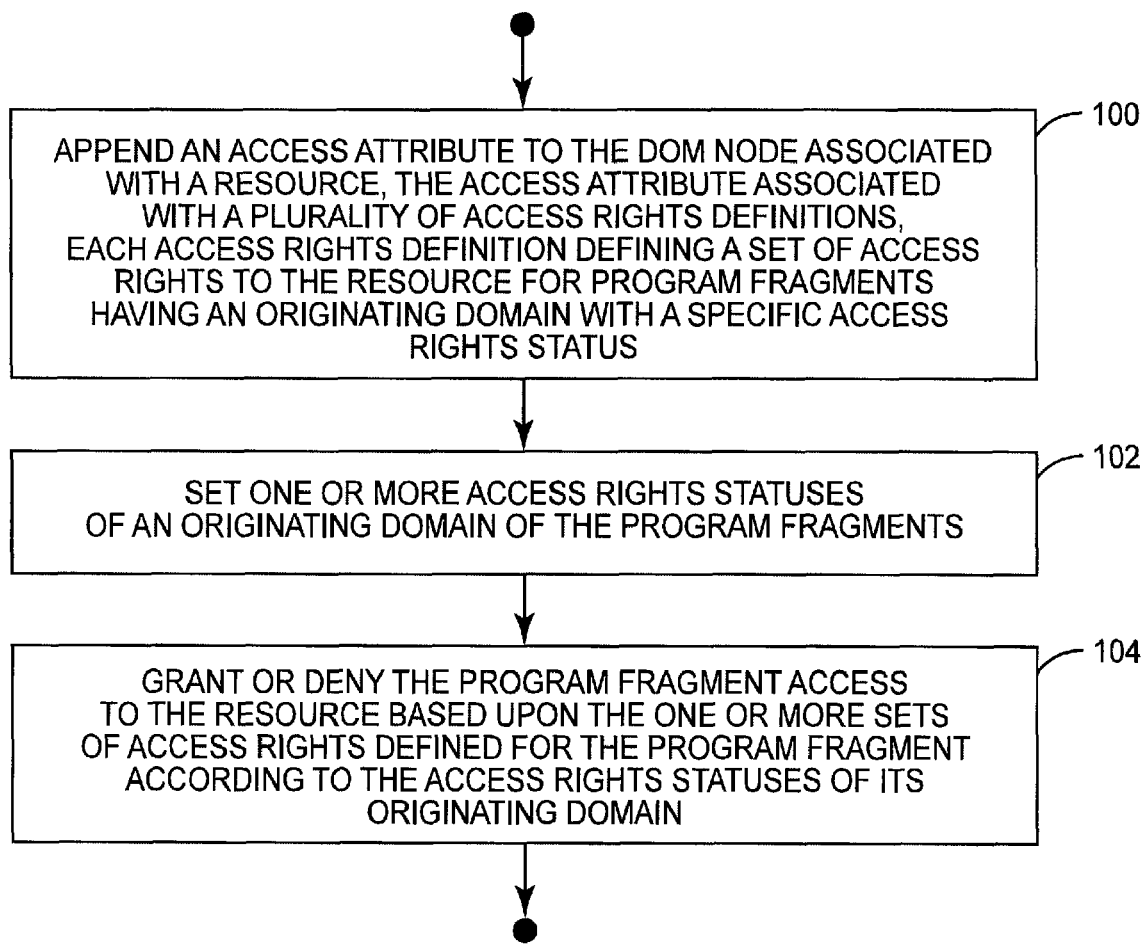
FIG. 2 is a logic flow diagram illustrating one embodiment of a method performed by the aggregated web application runtime environment of the instant invention.

In the embodiment of FIG. 2, the aggregated web application runtime environment 34 appends an access attribute to the DOM node associated with a resource (Block 100). The value of the appended access attribute is either specified explicitly in the web page of the aggregated web application, or alternatively, defaulted to a previously set value by the aggregated web application runtime environment 34. In either case, this appended access attribute is associated with a plurality of access rights definitions. Each access rights definition defines a set of access rights to the resource for program fragments having an originating domain with a specific access rights status.

An access rights status as used herein denotes any classification of one or more originating domains that is employed to define a set of access rights for program fragments originating from those domains. In operation, multiple originating domains may belong to the same classification, and therefore, have the same access rights status. In this case, the access rights status enables the defining of a set of access rights for program fragments originating from different domains without resort to explicit definitions based on each of those domains individually. In one embodiment described more fully below, for example, an access rights status of one or more originating domains may comprise a role status (e.g., an untrusted domain role, a fully trusted domain role, or a special domain role). A role definition may link multiple originating domain names with the same role status depending on the level of trust a web developer has for those certain originating domains (e.g., two distinct domains may both have a fully trusted domain role). In this case, any program fragment originating from any one of those multiple domains has a set of access rights defined by the same access rights definition.

However, a single originating domain may belong to multiple classifications, and therefore, have multiple access rights statuses (e.g., one domain may have both a fully trusted domain role and a special domain role). A program fragment originating from that domain, therefore, has multiple sets of access rights defined among multiple access rights definitions. In this case, the program fragment has a certain access right as long as it is included in any one of the sets of access rights defined by these multiple access right definitions.

To illustrate further, the set of access rights defined in each access rights definition may include low level access rights to the resource (e.g., read, write, or execute). A read access right permits a program fragment to examine the resource (e.g., textual content) via the associated DOM node. A write access right permits a program fragment to modify or delete the resource, while an execute access right permits a program fragment to invoke the resource (e.g., if the resource is a client-side script function). In the context of the above example where a program fragment has multiple sets of access rights defined among multiple access rights definitions, one access rights definition may define a set of access rights as including only a read access right while another access rights definition defines a set of access rights as including both a read access right and an execute access right. Because at least one of these sets of access rights includes an execute access right, the program fragment has this execute access right. Of course, those skilled in the art will understand that the particular types and number of access rights included in a set of access rights does not limit the instant invention. Rather, the particular types and number of access rights included merely affect the detail with which access to a resource may be controlled.

Irrespective of their type or number, whether a particular access right is included in a set of access rights defined by an access rights definition may vary based on the security and functionality requirements of the aggregated web application. For example, the aggregated web application may include a resource that comprises particularly sensitive information (e.g., a contact's phone number). In such a case, functionality requirements may dictate that all access rights be included for program fragments originating from one domain (e.g., the phonebook application domain), while stringent security requirements dictate that no access right be included for program fragments originating from other domains (e.g., the Google® Maps domain).

Other resources in the aggregated web application, however, may not comprise sensitive information (e.g., generic text). In this case, relaxed security requirements for that resource may only require that particular access rights (e.g., the ability to modify or delete) not be included for program fragments originating from certain domains.

Of course, no runtime environment has inherent knowledge of the functionality and security requirements necessitated by a particular resource of an aggregated web application. Accordingly, in one embodiment, the aggregated web application runtime environment 34 is configured to assume relaxed functionality and security requirements for all resources not associated with an access attribute whose value was specified explicitly in the web page of the aggregated web application. For each of these resources, the aggregated web application runtime environment 34 appends an access attribute to the associated DOM node by default. When an access attribute is appended by default, at least one of the access rights definitions associated with that access attribute defines a set of access rights that does not include some access rights (e.g., the ability to modify or delete). Those skilled in the art will readily appreciate, however, that the aggregated web application runtime environment 34 may assume any level of functionality and security requirements by default.

On the other hand, if an access attribute value was specified explicitly in the web page, the aggregated web application runtime environment 34 appends the access attribute to the associated DOM node without change. This allows a web developer of the aggregated web application to vary the level of functionality and security requirements for each resource. If the resource requires stringent privacy, for example, an access attribute may be specified explicitly in the web page so that at least one of the access rights definitions associated with that access attribute defines a set of access rights that does not include any access rights.

In one embodiment, however, the aggregated web application runtime environment 34 does not append an access attribute to a DOM node by default, even if no access attribute is explicitly specified for that DOM node in the web page. Specifically, if the DOM node is a child DOM node, that child DOM node inherits the access attribute of its closest parent DOM node if no access attribute is specified explicitly for the child DOM node itself. In such a case, the aggregated web application runtime environment 34 appends the access attribute specified in the web page for the parent DOM node.

With the sets of access rights to the resource defined through the appended access attribute as described above, the aggregated web application runtime environment 34 may control access of a program fragment to the resource. In order to do so, the aggregated web application runtime environment 34 sets one or more access rights statuses of the originating domain of that program fragment (Block 102). The aggregated web application runtime environment 34 may set these one or more access rights statuses according to an access rights status definition specified by a web developer. As mentioned above, for instance, a role definition may link certain originating domains with one or more role statuses depending on the level of trust a web developer has for that certain originating domain.

Regardless of how the aggregated web application runtime environment 34 sets the one or more access rights statuses of the originating domain of the program fragment, it thereafter grants or denies the program fragment access to the resource based upon one or more sets of access rights defined for the program fragment. (Block 104). The program fragment is granted the ability to access the resource in a certain manner (e.g. to modify or delete the resource) only if a corresponding access right is included in at least one of these sets of access rights. If no set of access rights includes the corresponding access right, however, the program fragment is denied such access.

Those skilled in the art will readily appreciate that the access control method illustrated in FIG. 2 may be structured in various ways. For example, the access control method may operate on the DOM structure directly within the memory space of the web browser client 10. Alternatively, the access control method may further comprise mapping the DOM structure to a file system (e.g., each DOM node being mapped to a file) and mapping the originating domain of a program fragment to a subject in that file system. In this case, controlling access to a resource by a program fragment originating from a certain domain becomes analogous to controlling access to a file by a subject in a file system. While the instant invention is not limited to mapping the DOM structure and originating domains to any particular type of file system, FIGS. 3A-C and 4 illustrate an embodiment where the file system is a role-based file system.

FIG. 3A illustrates a web page of an aggregated web application whose resources are controlled via mapping the DOM structure and originating domains to a role-based file system. Specifically, a web application from the domain company.se provides this web page to the web browser client 10. The web page contains JavaScript® at L4 that references an external API lib.js of a web application from the domain maps.google.com. Accordingly, the web browser client 10 imports the external API lib.js and executes the web page and lib.js as an aggregated web application.

This aggregated web application creates a Google® Maps map of coordinates set at L8 when the web page loads. Program fragments originating from company.se (at L6-L9) invoke program fragments that originated from maps.google.com (the GMap2 constructor and setCenter method implemented in lib.js). These program fragments originating from maps.google.com utilize the <div> tag at L13 to create a Google® Maps map therein. Functionality requirements of the aggregated web application, therefore, dictate that program fragments originating from maps.google.com have full access to the resources comprising the <div> tag at L13 and any tags dynamically created under that <div> tag.

Yet the aggregated web application also includes resources that comprise particularly sensitive information, namely the phone number at L16. Security requirements, thus, dictate that program fragments originating from maps.google.com have no access to these resources. However, resources that comprise merely general text, namely the text "The sky is blue, the grass is green" at L18, may be accessed in limited ways by program fragments originating from maps.google.com without compromising the security of the aggregated web application. Such program fragments may, for example, merely read without overwriting the general text contained within the aggregated web application. The aggregated web application runtime environment 34 advantageously controls access to these resources while meeting all of the above described functionality and security requirements.

Take for instance an attempt by program fragments originating from maps.google.com to access the phone number resource by reading it. The DOM associates the phone number resource with a text node within the DOM structure of the web page and the aggregated web application runtime environment 34 appends a "security" attribute to this text node. Specifically, this text node is a child DOM node of the parent DOM node at L14. Because the security attribute of the parent DOM node at L14 was explicitly specified as having a value of "company," the child DOM node inherits that security attribute also with the value of "company."

The security attribute with the value of "company" is associated with a plurality of access rights definitions via the policy definition illustrated in FIG. 3B. The policy definition specifies a plurality of access rights definitions for resources associated with DOM nodes having a specific security attribute appended thereto. Because the phone number resource is associated with a DOM node that has a security attribute with the value of "company" appended thereto, the policy definition specifies access rights definitions for this resource at P2, P5, and P8. P5, for example, defines a set of access rights (that includes read, write, and execute) to this resource for program fragments originating from a domain having a trustedoperator_role status. P2 and P8, on the other hand, each define a set of access rights (that doesn't include read, write, or execute) to this resource for program fragments originating from a domain having an untrustedoperator_role status or a specialoperator_role status, respectively. With access to resources defined according to role statuses of domains, the aggregated web application runtime environment 34 maps the DOM structure and domains to a role based access control file system.

This role based access control file system has a role definition illustrated in FIG. 3C, which defines one or more roles for the originating domains of program fragments. Specifically, the role definition defines a trustedoperator_role for company.se, while defining both an untrustedoperator_role and a specialoperator_role for maps.google.com. Accordingly, to control the access of program fragments originating from maps.google.com, the aggregated web application runtime environment 34 sets both an untrustedoperator_role status and a specialoperator_role status of maps.google.com.

With the role statuses of maps.google.com set, the aggregated web application runtime environment 34 may grant or deny program fragments originating from maps.google.com access to the phone number resource based on the sets of access rights in the access rights definitions at P2 and P8. Because no access right is included within either set of access rights defined at P2 or P8, a program fragment originating from maps.google.com may not access the phone number resource in any way. In denying such access to the phone number resource, the aggregated web application runtime environment 34 meets the stringent security requirements of the aggregated web application.

Yet the aggregated web application runtime environment 34 does not overly restrict access to resources when such access would not compromise the security of the aggregated web application. Accordingly, the aggregated web application runtime environment 34 permits read only access by program fragments originating from maps.google.com to the general text comprising "The sky is blue, the grass is green" at L18. Similar to the above description related to the phone number resource, the aggregated web application runtime environment 34 appends a security attribute to the DOM node associated with the general text resource. Because no security attribute is specified explicitly for that DOM node or any parent DOM node thereof, the security attribute is appended with a value of "default." The sets of access rights in the access rights definitions at P1 and P7, therefore, control the access of program fragments originating from maps.google.com to this general text resource. Because a read access right is included within at least one set of access rights defined at P1 and P7, a program fragment originating from maps.google.com may read the general text resource. However, no other access rights are included in either set of access rights, and therefore, those program fragments may not access the general text resource in any other way. In allowing limited access to the general text resource, the aggregated web application runtime environment 34 avoids overly restricting access to resources when such would not compromise the security of the aggregated web application.

Furthermore, the aggregated web application runtime environment 34 also retains the functionality required of the aggregated web application. In particular, the aggregated web application runtime environment permits full access by program fragments originating from maps.google.com to the resources comprising the <div> tag at L13 and any tags or script dynamically created within that <div> tag. Just as above, the aggregated web application runtime environment appends a security attribute with the value of "google" to the DOM node associated with the <div> tag. The sets of access rights in the access rights definitions at P3 and P9, therefore, control the access of program fragments originating from maps.google.com to this <div> tag resource. Because each of the read, write, and execute access rights are included within at least one set of access rights defined at P3 and P9, a program fragment originating from maps.google.com has full access to the <div> tag resource. Furthermore, any tags or script dynamically added to the web page under the <div> tag pursuant to such full access rights will likewise be associated with DOM nodes within the DOM structure. As child DOM nodes, they will inherit the security attribute also with the value of "google." Thus, program fragments originating from maps.google.com will also have full access to any resources comprising tags or script dynamically created under the <div> tag. In allowing full access to these resources, the aggregated web application runtime environment 34 meets the functionality requirements of the aggregated web application.

It should also be noted that the aggregated web application runtime environment 34 maintains the access rights of program fragments originating from company.se that are required for the functionality of the aggregated web application. For example, the access rights definitions at P4, P5, and P6 define the set of access rights to various resources for program fragments originating from the company.se domain (which has a role status of trustedoperator_role status as set relative to the role definition in FIG. 3C). As defined, such program fragments have full access to all resources except those having a security attribute with a value of "google" (namely, the <div> tag at L13 used by maps.google.com and the <script> tag at L4, which contains definitions (not shown) for the GMap2 constructor and the setCenter method imported from maps.google.com). Execute access permits, for example, the program fragments at L7 and L8 originating from company.se to invoke the GMap2 constructor and setCenter method originating from maps.google.com and thereby create a Google® Maps map. The lack of write access also protects these program fragments against inadvertently conflicting with that map (e.g., against inadvertently overwriting the definition for the setCenter method).

Those skilled in the art, however, will readily appreciate that the above example merely illustrates one embodiment of the instant invention. For instance, although the policy definition of FIG. 3B included access rights definitions defining sets of access rights without any access rights included (e.g., at P2, P3, P7, and P8), those skilled in the art will readily appreciate that the instant invention does not require such explicit definitions. Furthermore, those skilled in the art will readily appreciate that the above example may be generalized as the aggregated web application runtime environment 34 performing the method as illustrated in FIG. 4.

Figure 4:
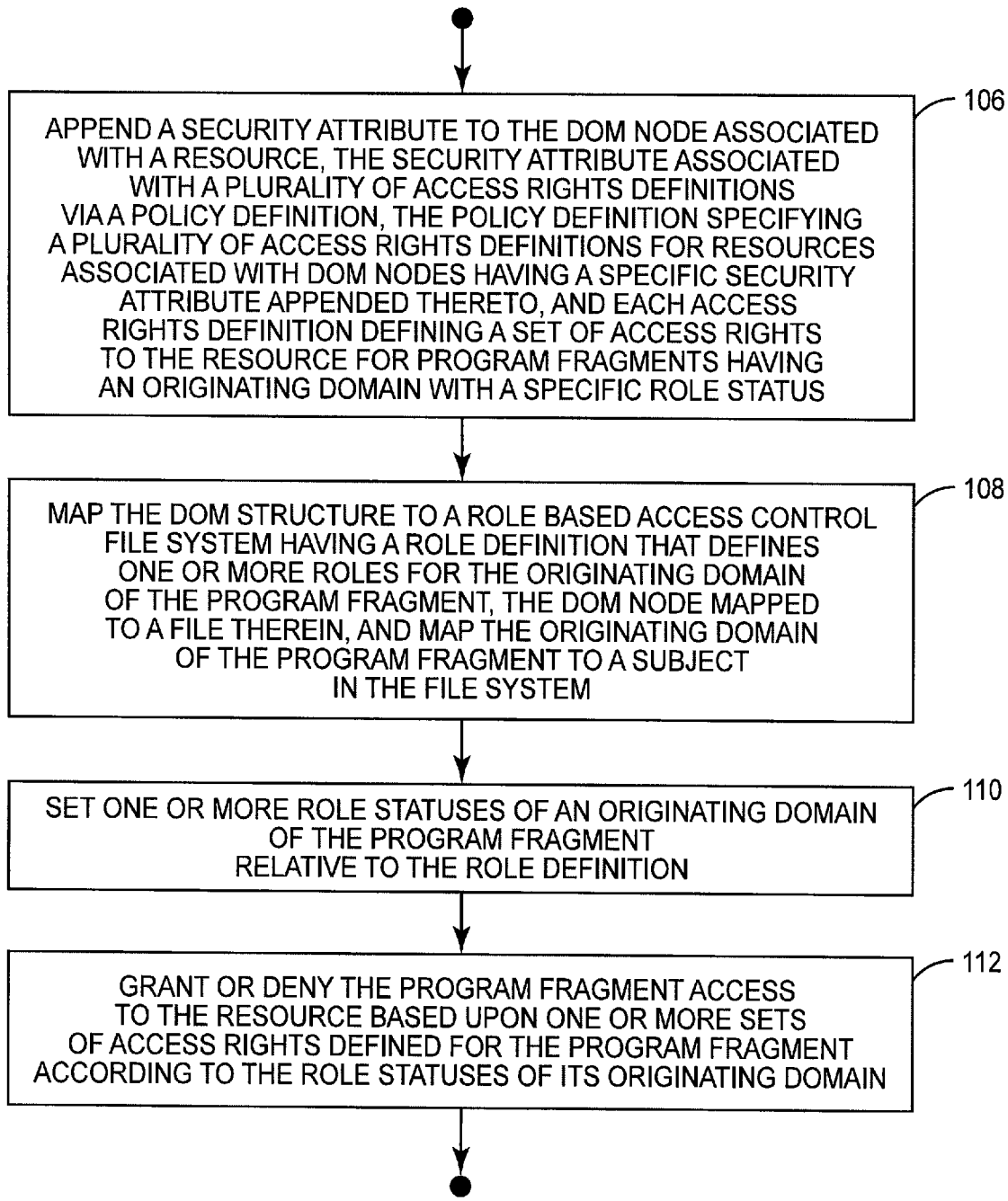
FIG. 4 is a logic flow diagram illustrating one embodiment of a method performed by the aggregated web application runtime environment of the instant invention, the method including mapping to a role based access control file system.

FIG. 4 illustrates a method of controlling access by a program fragment to a resource via mapping the DOM structure and originating domain of that program fragment to a role based access control file system. In FIG. 4, the aggregated web application runtime environment 34 appends a security attribute to the DOM node associated with the resource (Block 106). This appended security attribute is associated with a plurality of access rights definitions via a policy definition. Such association occurs due to the policy definition specifying a plurality of access rights definitions for resources associated with DOM nodes having a specific security attribute appended thereto. Each access rights definition defines a set of access rights to the resource for program fragments having an originating domain with a specific role status.

With access to resources defined according to role statuses of domains, the aggregated web application runtime environment 34 maps the DOM structure to a role based access control file system (Block 108). The role based access control file system has a role definition that defines one or more roles for the originating domain of the program fragment. As such, the DOM node associated with the resource is mapped to a file in the file system and the originating domain of the program fragment is mapped to a subject in the file system. Accordingly, to control the access of the program fragment to the resource, the aggregated web application runtime environment 34 sets one or more role statuses of the originating domain of the program fragment relative to this role definition (Block 110). With the role statuses of the originating domain of the program fragment set, the aggregated web application runtime environment 34 grants or denies the program fragment access to the resource based upon one or more sets of access rights defined for the program fragment (Block 112).

Figure 6:
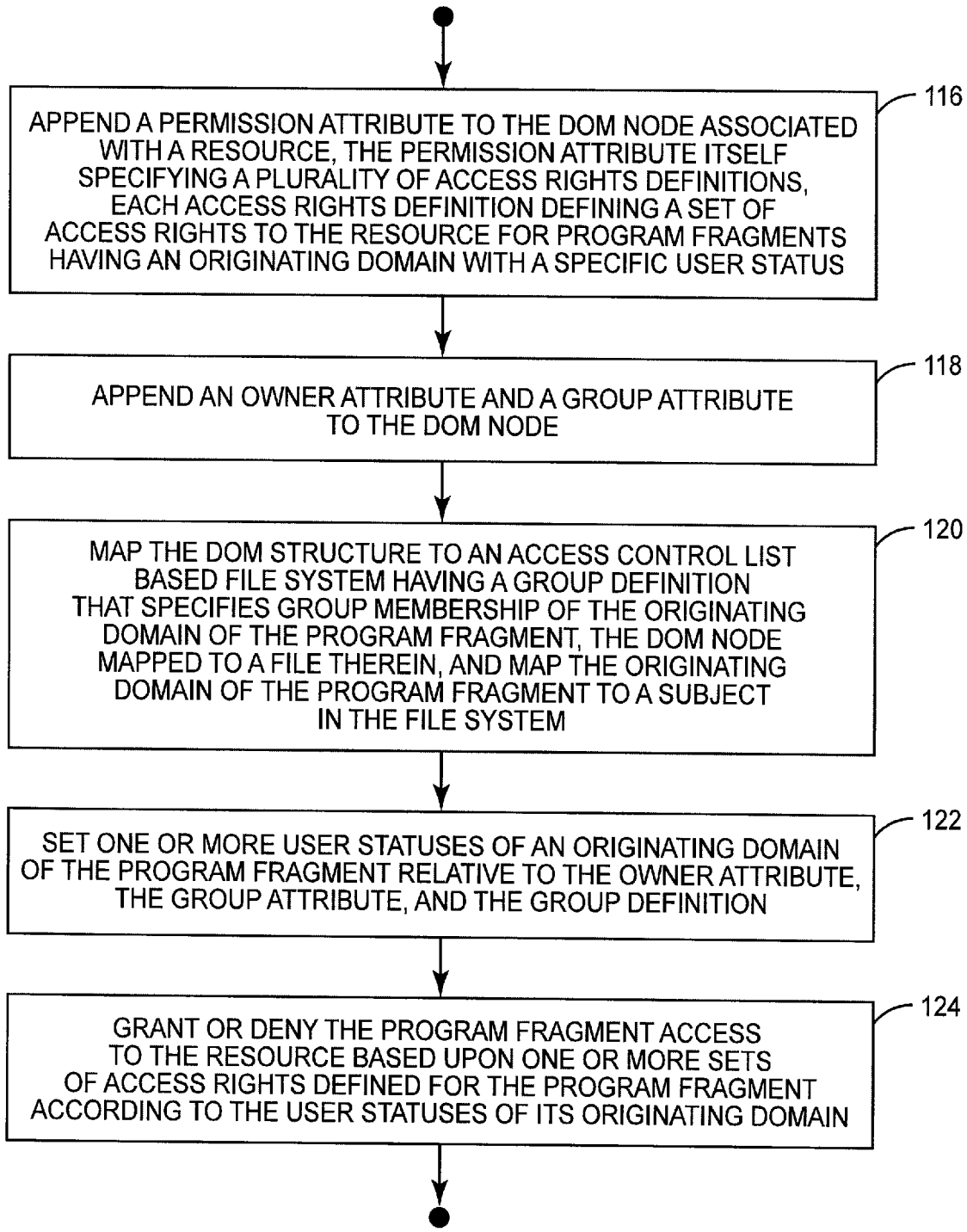
FIG. 6 is a logic flow diagram illustrating one embodiment of a method performed by the aggregated web application runtime environment of the instant invention, the method including mapping to an access control list based file system.

While the above described method for access control of the instant invention involves mapping the DOM structure and domains to a role based access control file system, those skilled in the art will appreciate that the instant invention may alternatively involve mapping to an access control list based file system. FIGS. 5A-B and 6, for example, illustrate this alternative method.

FIG. 5A illustrates a web page of an aggregated web application having similar functionality and security requirements as that of FIG. 3A. However, although the aggregated web application runtime environment 34 controls access of program fragments originating from maps.google.com and company.se to the same degree, it does so via mapping the DOM structure and originating domains to an access control list based file system. Utilizing an access control list based file system, the access attribute appended to a DOM node comprises a permission attribute in place of the above described security attribute.

Again taking the example of an attempt by program fragments originating from maps.google.com to read the phone number resource at L16, the aggregated web application runtime environment 34 appends a permission attribute to the DOM node associated with the text node. That is, the text node is a child DOM node of the parent DOM node at L14, and therefore, inherits the explicitly specified permission attribute of the parent DOM node with the value of "rwx------."

Unlike the security attribute in a previous embodiment, however, the permission attribute itself specifies a plurality of access rights definitions. In this embodiment, each access rights definition comprises three positions of the permission attribute value (e.g., "rwx," "---," and "---" are each access rights definitions). Each access rights definition defines a set of access rights to the phone number resource for program fragments having an originating domain with a specific user status. User statuses may comprise, for example, an owner status, a group member status, or an other user status. In this case, the access rights definition comprising the first three positions of the permission attribute, namely "rwx," defines a set of access rights to the phone number resource for program fragments having an originating domain with an owner status. Because this set of access rights includes "r," "w," and "x," such program fragments have read, write, and execute access to the phone number resource. On the other hand, the set of access rights defined by the second and third access rights definitions include neither "r," "w," or "x." Therefore, program fragments having an originating domain with only a group member status or an other user status, respectively, have neither read, write, or execute access rights to the phone number resource. With access rights to resources defined according to user statuses of domains, the aggregated web application runtime environment 34 also appends an owner attribute and a group attribute to the DOM node associated with that resource.

An owner attribute appended to the DOM node associated with a resource specifies the domain to be given the owner status for access to that resource. As with other attributes mentioned thus far, if no owner attribute is explicitly specified in the web page, the aggregated web application runtime environment 34 appends an owner attribute by default. An owner attribute appended by default specifies the originating domain of the resource. With regard to the phone number resource at L16, therefore, the aggregated web application runtime environment 34 appends an owner attribute having a value of "company.se" to the associated DOM node by default. With regard to the script resources imported from maps.google.com at L4, on the other hand, the aggregated web application runtime environment 34 appends an owner attribute having a value of "maps.google.com" to the associated DOM node by default.

Similarly, a group attribute appended to the DOM node associated with a resource specifies the group name of which a domain must be a member of to be given a group member status for access to that resource. Group membership of a domain may be specified explicitly in a group definition, such as that shown in FIG. 5B. The group definition of FIG. 5B specifies, for example, that the domain company.se is a member of the group having a name of "maps.google.com." The domain company.se, therefore, is given a group member status for access to all resources associated with a DOM node having a group attribute with a value of "maps.google.com" appended thereto. Note that the group definition in FIG. 5B does not contain a reciprocal group definition for the maps.google.com domain. That is, the domain maps.google.com is not given a group member status for access to resources associated with DOM nodes having a group attribute with a value of "company.se" appended thereto. Rather, group membership for the domain maps.google.com is limited to default group membership. Consistent with default group assignment in conventional access control list based file systems, the group of which a domain is a member of by default is the primary group of that domain. The primary group name of a domain is the domain name itself (e.g., the primary group name of the maps.google.com domain is "maps.google.com"). Thus, in this example, the domain maps.google.com is a member of the "maps.google.com" group and the domain company.se is a member of both the "company.se" and the "maps.google.com" groups.

Given such group membership definition, if no group attribute is explicitly specified in the web page, the aggregated web application runtime environment 34 appends a group attribute by default. A group attribute appended by default specifies the primary group of the domain given an owner status. With regard to the phone number resource at L16, therefore, the aggregated web application runtime environment 34 appends a group attribute to the associated DOM node by default because none is explicitly specified in the web page. As company.se is the domain given an owner status for access to the phone number resource, the value of the appended group attribute is "company.se," the primary group of company.se.

With a permission attribute, an owner attribute, and a group attribute appended to the DOM node associated with the phone number resource, the aggregated web application runtime environment 34 maps the DOM structure and domains to an access control list based file system. Accordingly, to control the access of program fragments originating from maps.google.com to the phone number resource, the aggregated web application runtime environment 34 sets one or more user statuses of maps.google.com relative to this owner attribute, group attribute, and group definition. Because the owner attribute specifies "company.se" as the domain having an owner status and the group attribute specifies domains must belong to the group "company.se" to have a group member status, the aggregated web application runtime environment 34 sets maps.google.com with an other user status.

With the user status of maps.google.com set, the aggregated web application runtime environment 34 may grant or deny program fragments originating from maps.google.com access to the phone number resource based on the set of access rights defined in the third access rights definition, namely "---." Because no access right is included in this set, a program fragment originating from maps.google.com may not access the phone number resource in any way. Similar to that in FIG. 3A-3C, then, the aggregated web application runtime environment 34 meets the stringent security requirements of the aggregated web application.

Also in this embodiment, the aggregated web application runtime environment 34 does not overly restrict access to resources when such access would not compromise the security of the aggregated web application. Accordingly, the aggregated web application runtime environment 34 permits read only access by program fragments originating from maps.google.com to the general text comprising "The sky is blue, the grass is green" at L18. Because no permission attribute is specified explicitly in the web page, the aggregated web application runtime environment appends by default a permission attribute with a predetermined value. Such default value may be, for example, "rwxr--r--," to thereby permit full access by program fragments originating from domains having an owner status, but permitting only read access by program fragments originating from domains having only either a group member status or an other user status. With the owner attribute and group attribute each appended by default with a value of "company.se," the aggregated web application runtime environment 34 again sets maps.google.com with an other user status. Because only a read access right is included within the set of access rights defined in the third access rights definition, namely "r--," program fragments originating from maps.google.com may read without modifying the general text resource. Again similar to that in FIG. 3A-3C, the aggregated web application runtime environment 34 avoids overly restricting access to resources when such would not compromise the security of the aggregated web application.

The aggregated web application runtime environment 34 also retains the functionality of the aggregated web application. In particular, the aggregated web application runtime environment 34 permits full access by program fragments originating from maps.google.com to the resources comprising the <div> tag at L13 and any tags or script dynamically created within that <div> tag. In order to do so, the aggregated web application runtime environment 34 appends an owner attribute with the value of "maps.google.com" as specified explicitly in the web page. As neither a group attribute nor a permission attribute are specified explicitly in the web page, though, the aggregated web application runtime environment 34 appends these attributes by default. That is, the appended group attribute has a value of "maps.google.com," as the primary group of the domain having an owner status, and the appended permission attribute has the predetermined value of "rwxr--r--." Thus, because the first access rights definition, "rwx," defines the set of access rights to the <div> tag for program fragments originating from maps.google.com, as the domain set with the owner status, such program fragments have full access to this <div> tag. Moreover, any tags or script dynamically added to the web page under this <div> tag pursuant to such full access rights will likewise be associated with DOM nodes within the DOM structure. As child DOM nodes, they will inherit each of the permission attribute, owner attribute, and group attribute also with the same values. Thus, program fragments originating from maps.google.com will also have full access to any resources comprising tags or script dynamically created under the <div> tag. In allowing full access to these resource, the aggregated web application runtime environment 34 meets the functionality requirements of the aggregated web application.

It should also be noted that the aggregated web application runtime environment 34 maintains the access rights of program fragments originating from company.se that are required for the functionality of the aggregated web application. For example, company.se is set by default with the owner status for access to the phone number resource and the general text resource. As such, program fragments originating from company.se have full access rights based on the explicit access rights definition "rwx" for the phone number resource and based on the default access rights definition "rwx" for the general text resource. With regard to the <div> tag resource, company.se is set with an other user status for access thereto because maps.google.com is set explicitly with the owner status. Thus, program fragments originating from company.se have read only access rights based on the default access rights definition "r--" for the <div> tag resource. Finally, with regard to the <script> tag at L4, which contains definitions (not shown) for the GMap2 constructor and the setCenter method imported from maps.google.com, the permission attribute specifies that program fragments originating from a domain having a group member status have execute access to GMap2 and setCenter. As the group definition in FIG. 5B assigns the company.se domain to be a member of the "maps.google.com" group, program fragments at L7 and L8 originating from company.se may invoke the GMap2 constructor and setCenter method to create a Google® Maps map. The lack of write access also protects these program fragments against inadvertently conflicting with that map.

Those skilled in the art will readily appreciate that the above example merely illustrates one embodiment of the instant invention. For instance, those skilled in the art will readily appreciate that the above example may be generalized as the aggregated web application runtime environment 34 performing the method as illustrated in FIG. 6.

FIG. 6 illustrates a method of controlling access by a program fragment to a resource via mapping the DOM structure and originating domain of that program fragment to an access control list based file system. In FIG. 6, the aggregated web application runtime environment 34 appends a permission attribute to the DOM node associated with the resource (Block 116). This appended permission attribute itself specifies a plurality of access rights definitions. Each access rights definition defines a set of access rights to the resource for program fragments having an originating domain with a specific user status. User statuses may comprise, for example, an owner status, a group member status, and an another user status.

With access to resources defined according to user statuses of domains, the aggregated web application runtime environment 34 also appends an owner attribute and a group attribute to the associated DOM node (Block 118). With a permission attribute, an owner attribute, and a group attribute appended to the DOM node associated with the resource, the aggregated web application runtime environment 34 maps the DOM structure to an access control list based file system (Block 120). The access control list based file system has a group definition that specifies group membership of the originating domain of the program fragment. As such, the DOM node associated with the resource is mapped to a file in the file system and the originating domain of the program fragment is mapped to a subject in the file system.

Accordingly, to control the access of the program fragment to the resource, the aggregated web application runtime environment 34 sets one or more user statuses of the originating domain of the program fragment relative to this group definition, the owner attribute, and the group attribute (Block 122). With the one or more user statuses of the originating domain of the program fragment set, the aggregated web application runtime environment 34 grants or denies the program fragment access to the resource based upon one or more sets of access rights defined for the program fragment (Block 112).

The above described examples and methods for access control are provided merely to illustrate, not limit, the instant invention. Indeed, the instant invention may be performed as part of a larger process. For example, the aggregated web application runtime environment 34 may control access by a program fragment to a resource also based upon the issuance of one or more security certificates issued to the originating domain of that program fragment. That is, the aggregated web application runtime environment 34 may set one or more access rights statuses of an originating domain only if a certain security certificate has been issued to that domain. In the embodiments previously described, for instance, the aggregated web application runtime environment may set a role status or a group member status of an originating domain only if that originating domain has been issued a certain security certificate.

It should also be noted that the instant invention is not limited to any particular application. Accordingly, the aggregated web application runtime environment 34 may comprise not only a web browser client engine, but also a widget framework or a runtime environment with mobile terminal platform access. FIGS. 7A-7D (role based) and 8A-8C (access control list based), for example, illustrate the instant invention as controlling access via the issuance of security certificates.

Different from the aggregated web application presented in FIGS. 3A-3C and FIGS. 5A-5B, which created a Google® Maps map at preset coordinates, the aggregated web application of FIGS. 7A-7D and FIGS. 8A-8C creates a Google® Maps map of coordinates corresponding to a mobile terminal's current location. Thus, additional functionality requirements dictate that program fragments originating from maps.google.com have at least some level of access to the exposed APIs of the mobile terminal platform for retrieving the mobile terminal's current location. Of course, security requirements also dictate that this access be limited. The aggregated web application runtime environment 34 controls such access based upon the issuance of one or more security certificates issued to maps.google.com.

In this embodiment, various levels of security certificates permit various levels of access to the mobile terminal platform. Access to the mobile terminal platform comprises a level 1 API, a level 2 API, and a level 3 API. A level 1 API includes access to mostly read-only information, such as a mobile terminal's power status, as well as control of the mobile terminal's backlight or vibration. A level 2 API includes access to private information, such as contact details from the phone book and the mobile terminal's current location. Access to functionality that incurs a charge to the subscriber, however, is only included in the level 3 API. With such a hierarchy, access to an API level above level 1 requires a security certificate corresponding to that level.

If an originating domain obtains a level 2 API or level 3 API security certificate, the aggregated web application runtime environment 34 sets a corresponding role status or user status of that domain. In FIGS. 7A-7D and 8A-8C, for example, maps.google.com has obtained a level 2 API security certificate, but not a level 3 API security certificate. Accordingly, the aggregated web application runtime environment 34 sets maps.google.com with a role status in FIG. 7D (specialoperator_role status) or a group member status in FIG. 8C (level2api.embrace.ericsson.com) so that program fragments originating from maps.google.com have execute access to the level 2 API script at L4, but no access to the level 3 API script at L5. As illustrated in FIGS. 7B and 8B, this level 2 access allows program fragments originating from maps.google.com to execute the getLatitude( ) and getLongitude( ) methods of the mobile terminal platform. In allowing such program fragments the ability to retrieve the mobile terminal's current location, the aggregated web application runtime environment meets the functionality requirements of the aggregated web application.

Moreover, in denying level 3 API access to program fragments originating from maps.google.com, the aggregated web application runtime environment 34 also meets the security requirements of the aggregated web application. Without level 3 API access, such program fragments may not invoke the makeVoiceCall method of the mobile terminal platform, which would incur a charge for the subscriber. Rather, in this example, only program fragments originating from company.se, which has obtained a level 3 API security certificate, may invoke this method. That is, the aggregated web application runtime environment 34 sets company.se with a role status in FIG. 7D (trustedoperator_role status) or a group member status in FIG. 8C (level3api.embrace.ericsson.com) so that program fragments originating from company.se have full access to the level 3 API script at L5. Such level 3 API access allows program fragments at L16 originating from company.se to execute the makeVoiceCall method of the mobile terminal platform.

Note also that the aggregated web application runtime environment 34 limits the access of program fragments originating from level2api.embrace.ericsson.com and level3api.embrace.ericsson.com to resources from company.se and maps.google.com. Referring to FIG. 8C, for example, the domains level2api.embrace.ericsson.com and level3api.embrace.ericsson.com are not members of the group "maps.google.com." As the permission attribute for the <script> resource imported from maps.google.com at L6 specifies no access rights for domains having an other user status, program fragments originating from level2api.embrace.ericsson.com and level3api.embrace. ericsson.com have no access to such resources.

It should be understood, of course, that the foregoing description and the accompanying drawings represent non-limiting examples of the methods and individual apparatuses taught herein. As such, the present invention is not limited by the foregoing description and accompanying drawings. Instead, the present invention is limited only by the following claims and their legal equivalents.

What is claimed is:

1. A method of controlling access by a program fragment of an aggregated web application to a resource within an aggregated web application runtime environment having a Document Object Model (DOM) structure, said resource associated with a DOM node within the DOM structure, comprising:
appending an access attribute to said DOM node, the access attribute associated with a plurality of access rights definitions, each access rights definition defining a set of access rights to said resource for program fragments having an originating domain with a specific access rights status;
setting one or more access rights statuses of an originating domain of said program fragment; and
granting or denying said program fragment access to said resource based upon the one or more sets of access rights defined for said program fragment according to the access rights statuses of its originating domain.

2. The method of claim 1, further comprising:
mapping the DOM structure to a file system, said DOM node mapped to a file therein; and
mapping the originating domain of said program fragment to a subject in the file system.

3. The method of claim 2:
wherein the file system is a role-based access control file system having a role definition that defines one or more roles for the originating domain of said program fragment;
wherein the access attribute comprises a security attribute, the security attribute associated with a plurality of access rights definitions via a policy definition, the policy definition specifying a plurality of access rights definitions for resources associated with DOM nodes having a specific security attribute appended thereto;
wherein the access rights statuses comprise role statuses; and
wherein setting one or more access rights status comprises setting one or more role statuses relative to the role definition.

4. The method of claim 2:
further comprising appending an owner attribute and a group attribute to said DOM node;
wherein the file system is an access control list based file system having a group definition that specifies group membership of the originating domain of said program fragment;
wherein the access attribute comprises a permission attribute, the permission attribute itself specifying a plurality of access rights definitions;
wherein the access rights statuses comprise user statuses, the user statuses comprising an owner status, a group member status, and an other user status; and
wherein setting one or more access rights statuses comprises setting one or more user statuses relative to the owner attribute, the group attribute, and the group definition.

5. The method of claim 4, wherein said DOM node is a child DOM node of a parent DOM node, wherein appending the owner attribute to said DOM node comprises inheriting an owner attribute of the parent DOM node, and wherein appending the group attribute to said DOM node comprises inheriting a group attribute of the parent DOM node.

6. The method of claim 4, wherein the owner attribute and the group attribute are appended to said DOM node by default, the owner attribute specifying the originating domain of said resource and the group attribute specifying a primary group of the originating domain of said resource.

7. The method of claim 4, wherein the owner attribute and the group attribute are appended to said DOM node explicitly for functionality, the owner attribute specifying the originating domain of said program fragment and the group attribute specifying a primary group of the originating domain of said program fragment.

8. The method of claim 1, wherein the access attribute is appended to said DOM node by default, at least one of the plurality of associated access rights definitions defining a set of access rights that does not include some access rights.

9. The method of claim 1, wherein the access attribute is appended to said DOM node explicitly for privacy, at least one of the plurality of associated access rights definitions defining a set of access rights that does not include any access rights.

10. The method of claim 1, wherein said DOM node is a child DOM node of a parent DOM node and wherein appending the access attribute to said DOM node comprises inheriting an access attribute of the parent DOM node.

11. The method of claim 1, wherein setting one or more access rights statuses of the originating domain of said program fragment comprises setting one or more access rights statuses based upon the issuance of one or more security certificates issued to the originating domain of said program fragment.

12. A web browser client comprising:
a network interface circuit for communicatively coupling the web browser client to a plurality of web applications;

a memory containing web browser application code;
one or more processing circuits communicatively coupled to the memory and the network interface; and
a web browser application, executed by the one or more processing circuits, including an aggregated web application runtime environment having a Document Object Model (DOM) structure and a resource therein, said resource associated with a DOM node within the DOM structure, the aggregated web application runtime environment configured to control access by a program fragment of an aggregated web application to said resource via:
 appending an access attribute to said DOM node, the access attribute associated with a plurality of access rights definitions, each access rights definition defining a set of access rights to said resource for program fragments having an originating domain with a specific access rights status;
 setting one or more access rights statuses of an originating domain of said program fragment; and
 granting or denying said program fragment access to said resource based upon the one or more sets of access rights defined for said program fragment according to the access rights statuses of its originating domain.

13. The web browser client of claim 12, the aggregated web application runtime environment further configured to control access by said program fragment to said resource via:
 mapping the DOM structure to a file system, said DOM node mapped to a file therein; and
 mapping the originating domain of said program fragment to a subject in the file system.

14. The web browser client of claim 13:
 wherein the file system is a role-based access control file system having a role definition that defines one or more roles for the originating domain of said program fragment;
 wherein the access attribute comprises a security attribute, the security attribute associated with a plurality of access rights definitions via a policy definition, the policy definition specifying a plurality of access rights definitions for resources associated with DOM nodes having a specific security attribute appended thereto;
 wherein the access rights statuses comprise role statuses; and
 wherein the aggregated web application runtime environment is configured to set one or more access rights statuses by setting one or more role statuses relative to the role definition.

15. The web browser client of claim 13:
 wherein the aggregated web application runtime environment is further configured to append an owner attribute and a group attribute to said DOM node;
 wherein the file system is an access control list based file system having a group definition that specifies group membership of the originating domain of said program fragment;
 wherein the access attribute comprises a permission attribute, the permission attribute itself specifying a plurality of access rights definitions;
 wherein the access rights statuses comprise user statuses, the user statuses comprising an owner status, a group member status, and an other user status; and
 wherein the aggregated web application runtime environment is configured to set one or more access rights statuses via setting one or more user statuses relative to the owner attribute, the group attribute, and the group definition.

16. The web browser client of claim 15, wherein said DOM node is a child DOM node of a parent DOM node, wherein the aggregated web application runtime environment is configured to append the owner attribute to said DOM node via inheriting an owner attribute of the parent DOM node, and wherein the aggregated web application runtime environment is configured to append the group attribute to said DOM node via inheriting a group attribute of the parent DOM node.

17. The web browser client of claim 15, wherein the aggregated web application runtime environment is configured to append an owner attribute and a group attribute to said DOM node by default, the owner attribute specifying the originating domain of said resource and the group attribute specifying a primary group of the originating domain of said resource.

18. The web browser client of claim 15, wherein the aggregated web application runtime environment is configured to append an owner attribute and a group attribute to said DOM node explicitly for functionality, the owner attribute specifying the originating domain of said program fragment and the group attribute specifying a primary group of the originating domain of said program fragment.

19. The web browser client of claim 12, wherein the aggregated web application runtime environment is configured to append an access attribute to said DOM node by default, at least one of the plurality of associated access rights definitions defining a set of access rights that does not include some access rights.

20. The web browser client of claim 12, wherein the aggregated web application runtime environment is configured to append an access attribute to said DOM node explicitly for privacy, at least one of the plurality of associated access rights definitions defining a set of access rights that does not include any access rights.

21. The web browser client of claim 12, wherein said DOM node is a child DOM node of a parent DOM node and wherein the aggregated web application runtime environment is configured to append the access attribute to said DOM node via inheriting an access attribute of the parent DOM node.

22. The web browser client of claim 12, wherein the aggregated web application runtime environment is configured to set one or more access rights statuses of the originating domain of said program fragment via setting one or more access rights statuses based upon the issuance of one or more security certificates issued to the originating domain of said program fragment.

* * * * *